United States Patent [19]
Hawkinson

[11] Patent Number: 5,728,305
[45] Date of Patent: Mar. 17, 1998

[54] WASTE WATER PURIFICATION SYSTEM

[75] Inventor: Jay M. Hawkinson, Coal Valley, Ill.

[73] Assignee: Water Recycling Systems, Inc., Coal Valley, Ill.

[21] Appl. No.: 769,302

[22] Filed: Dec. 19, 1996

Related U.S. Application Data

[62] Division of Ser. No. 566,372, Dec. 1, 1995, Pat. No. 5,626,745, which is a continuation of Ser. No. 329,839, Oct. 27, 1994, abandoned.

[51] Int. Cl.⁶ .................... C02F 1/78; B01D 36/04
[52] U.S. Cl. .................. 210/760; 210/641; 210/694; 210/804; 210/806
[58] Field of Search .................... 210/641, 650, 210/651, 694, 721, 744, 760, 765, 804, 806, 101, 104, 192, 195.2, 196, 202, 203, 522

[56] References Cited

U.S. PATENT DOCUMENTS

| | | | |
|---|---|---|---|
| 3,883,429 | 5/1975 | Hanford | 210/104 |
| 3,920,550 | 11/1975 | Farrell, Jr. et al. | 210/104 |
| 4,341,636 | 7/1982 | Harder et al. | 210/694 |
| 4,431,545 | 2/1984 | Pall et al. | 210/641 |
| 4,969,991 | 11/1990 | Valadez | 210/104 |
| 4,988,445 | 1/1991 | Fulk, Jr. | 210/195.2 |
| 5,080,807 | 1/1992 | Carr et al. | 210/651 |
| 5,234,606 | 8/1993 | Kazama et al. | 210/760 |
| 5,336,413 | 8/1994 | van Staveren | 210/760 |
| 5,366,634 | 11/1994 | Viyajan et al. | 210/651 |
| 5,368,726 | 11/1994 | Masoomian | 210/203 |
| 5,372,711 | 12/1994 | Sill | 210/202 |
| 5,512,178 | 4/1996 | Dempo | 210/760 |

Primary Examiner—Neil McCarthy
Assistant Examiner—Theodore M. Green
Attorney, Agent, or Firm—Dressler, Rockey, Milnamow, & Katz, Ltd.

[57] ABSTRACT

Waste water is reclaimed for reuse by combined use of settling tanks, ozonation and filtration. The settling tanks remove substantial solid matter from the waste water. The waste water from the last settling tank is treated with ozone to remove contaminants and purify the water. This ozonated water is then returned to the last settling tank to mix with the waste water. This ozonated water in the last tank is then subjected to a plurality of filtering actions before being stored in a clean water holding tank. Partially treated water or discharge from filters is returned to a different holding tank to mix with waste water and dilute the waste water.

3 Claims, 2 Drawing Sheets

WASTE WATER PURIFICATION SYSTEM

This is a divisional of application(s) Ser. No. 08/566,372, U.S. Pat. No. 5,626,745, filed on Dec. 1, 1995, which is a continuation of Ser. No. 08/329,839 filed on Oct. 27, 1994, abandoned.

BACKGROUND OF THE INVENTION

1) Field of the Invention

This invention relates to a process for reclaiming waste water and to apparatus suitable for use in said process.

One of the fundamental needs for human beings is their water supply. With the rapid growth of the population measures for recycling or treating of waste water in order to reclaim it have become a necessity and one of the requirements for human existence. A satisfactory commercial process for reclaiming waste water must have rapid action to provide a recycle rate equal to the demand rate. This rapid action must and should be accomplished with a minimum of apparatus.

Any process is better if accomplished without any chemical additives such as, high molecular weight organic acids or their metallic salts as described in U.S. Pat. Nos. 4,092,242 and 4,198,294 which are also directed to reclamation of waste water including that produced from laundry operations.

2) Related Art

U.S. Pat. No. 5,180,499 discloses a system for removal of solid chemical and bacterial waste from water, which includes the use of ozone dissolved in an oxygen rich carrier while under pressure. This use of the oxidant, such as ozone in the process described in the patent, results in a flocculation of the solid matter in the waste water. This flocculation floats to the top of a tank where it may be removed. A second step of the process includes inserting waste water under pressure into the system and combining homogeneously ozone and a highly oxygenated carrier with the mixture being electronically disbursed throughout the system.

Such flocculation and electronically disbursing of oxygen or ozone will clarify the system, but would not be satisfactory because the flocculation must be removed. U.S. Pat. No. 5,273,664 describes a water treatment apparatus for purification by ozone injection at a plurality of points, a contact period for ozone to react with contaminants. This patent shows no means for removing solids material from waste water. Such an ozone mixture would not perform the functions of this waste water reclaiming system, but could provide the ozone for the ozone infusion injection process section of this invention.

These patents neither singly nor in any reasonable combination, suggest or disclose the present invention.

BRIEF SUMMARY OF THE INVENTION

In accordance with the present invention, a waste water reclamation system is provided for treating water with both ozone and filtration to provide improved and efficient pure water reclamation from waste water. The apparatus combines the known use of ozone with a plurality of filtering systems to provide a novel waste water reclamation system. The waste water reclamation system of this invention provides for the purification of the water and the removal of many solids by settling of sediment to the bottom of the plurality of tanks. This waste water reclamation system furthermore provides a means for removing chlorine and possibly other chemicals by filtration and the removal of many solids and dissolved solids through filtration.

This water purification system accomplishes the treatment of waste water to produce pure water without the flocculation sometimes produced by the introduction of ozone.

The waste water treatment system of this invention will produce purified recycled water in useable quantity with a minimum of apparatus.

In this waste water reclamation system ozone is utilized as an oxidant in the waste water to destroy organic and inorganic water-borne matter. The destroyed matter is then separated from the water flow through a succession of filters, which progressively remove impurities, suspended solids and dissolved solids. The resulting recycled water purity from this waste water reclamation system normally has a purity level better than the original potable water drawn at the user site.

The waste water disposable system of this invention can be designed to clean the waste water to a purity level sufficient to meet environmental protection laws so that the water can be disposed of in a municipal drainage system or can be totally recycled and reused in accordance with more stringent environmental protection laws regarding clean water.

DETAILED DESCRIPTION OF THE INVENTION

Figure 1A:
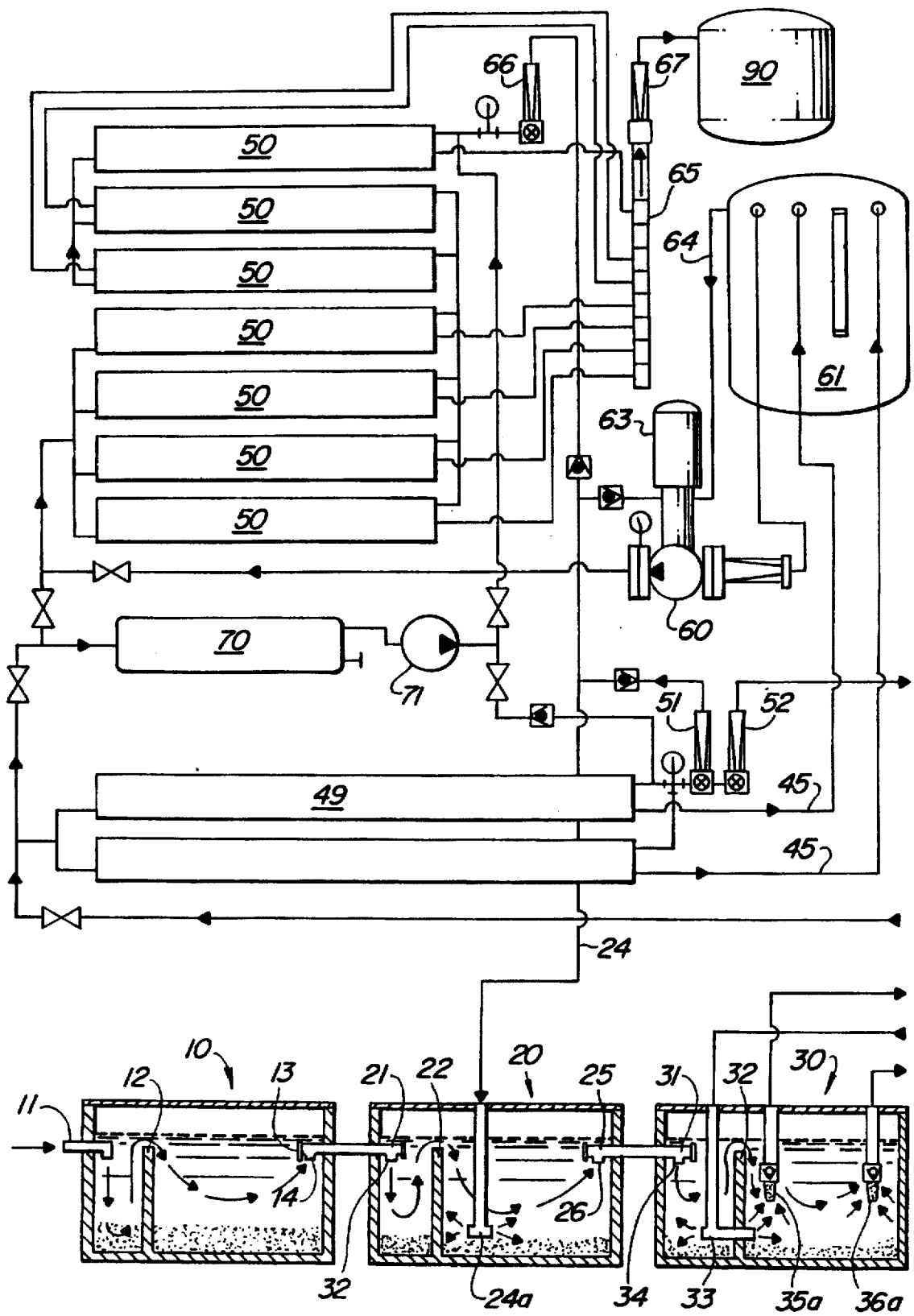
FIG. 1A—is a schematic representation of a portion of the system of this invention, including filtration tanks and filters, and the interconnections to FIG. 1B.
Figure 1B:
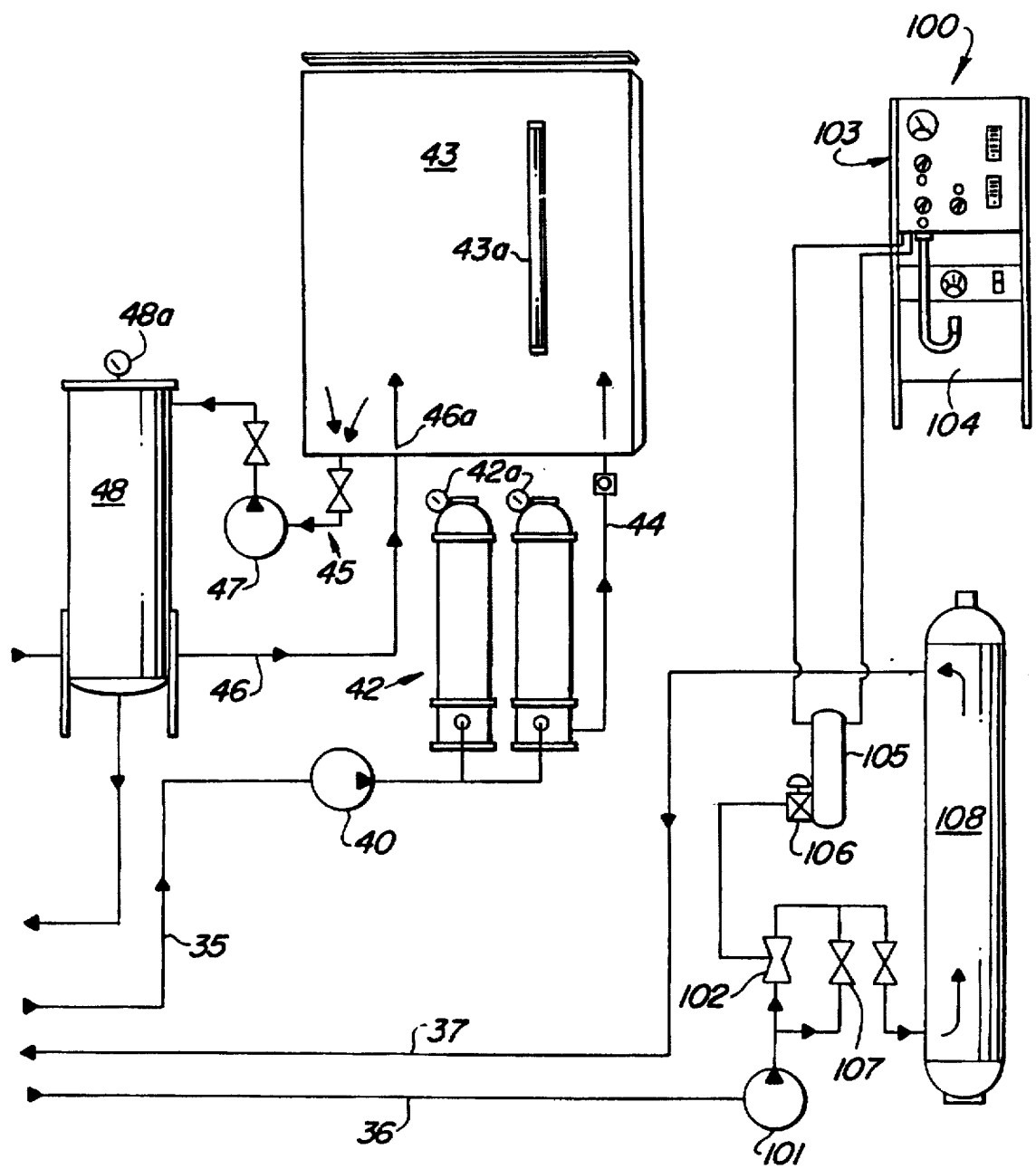
FIG. 1B—is a schematic representation of the remainder of the system of this invention, including the ozonation system, some filtration systems and the interconnections to FIG. 1A.

With the reference now to the drawings and particularly to FIGS. 1A and 1B, a preferred embodiment of the process of the present invention is illustrated in considerable detail. In order to provide a complete understanding of the process and its novel aspects a quantity of contaminated water will be followed through the apparatus showing at the same time the process of treatment.

Referring now to FIG. 1A, waste water from washing machines or other commercial use is discharged and flows into underground tank 10 through pipe 11. Tanks 10, 20 and 30 are each made with an internal baffle 12, 22 and 32, which creates two internal basins in each of the tanks. The incoming water to each tank successively enters the basin created in front of the baffle and then cascades over the top of the baffle to fill the second internal basin. As shown in FIG. 1A lint and heavy dirt particles will settle to the bottom of the tanks 10, 20 and 30 as the waste water flows through the tanks and encounters the baffling of barriers 12, 22 and 32. Each of the interconnecting water feed pipes 21 and 31 are located at the internal baffle height. Pipes 21 and 31 contain inlets and/or outlets 13, 14, 25, 26, and 34. Tank 30 includes baffle 32. A pipe 24 is plumbed into the second tank 20. This pipe 24 carries the discharge concentrate water collected from the waste water systems carbon filter 61, micro filters 49 and nano filters 50. Concentrate water is that portion of the feed water presented to the various filter membranes that is not passed through the membranes. The concentrate is previously filtered water but carries particulates larger than the specific membrane pores of the filters through which it has previously passed can accept.

This concentrate is fed into the second basin through a tee opening 24a. The waste water, now including concentrate water, flows from tank 20 into tank 30 through the interconnecting pipe 31 located at internal baffle height. A single pipe 37 carrying the ozonated water from the ozone generation system 100 is plumbed into the first basin of tank 30. Pipe 33 is terminated with a plumbing tee or defuser. This defuser is one-quarter the depth above the tank bottom and has one side of the plumbing tee extending through the baffle to put ozonated water in both internal basins of tank 30 for dispersion. This ozonated water flows and mixes with the waste water in tank 30 and as it mixes oxidizes and purifies the organic and inorganic matter borne in the water. Ozonated waste water cascades over the internal baffle 32 inside tank 30 into the second internal basin.

Two pipes 35 and 36 are plumbed to mid-water depth inside the second internal basin in tank 30. The water draw line 36 is connected to the ozone recirculation pump and is located near the side of the second basin in tank 30 furthest from the baffle 32. A foot valve, or check valve 36a is fitted to the pipe inlet so that when pump vacuum is created by the ozone recirculation pump 101 the check valve 36a opens to cause water to flow and supply water to the ozone injection portion 102. The check valve closes to hold water inside the pipe, i.e. to hold the pump in prime when not in operation. The water draw pipeline 35 connects to the main draw pump 40 and is plumbed from a point inside the second basin of tank 30 near the baffle wall 32. A check valve 35a is fitted to the pipe inlet and the inlet located at mid-depth of the water level inside the tank 30. When the pump 40 operates pump vacuum is created in the draw pipe 35 and check valve 35a opens to cause ozonated water from tank 30 to flow into the first filtration stage.

The ozone application section 100 is a first portion of this waste water reclamation system. The ozonation application function consists of an ozone recirculation pump 101, a gas to water injector 102, an ozone contact tower 108, oxygen generator 104, and an electrical ozone generator 103. This ozonation system turns on and operates when a low water signal from the finished water holding tank 90 activates the waste water reclamation system operation controls.

The control system of this invention includes a plurality of sensors, automatic switches and valves responsive to signals from their respective sensors to activate the valves or pumps associated therewith by computer programs and are not illustrated herein. Any person skilled in the art could determine and install the necessary sensors and programming to fulfill the flow and functions described herein.

The ozone operation on the waste water is designed to have an off delay extension to sustain the ozone oxidation in the waste water tank 30 for a period of time sufficient to destroy the organic and inorganic water-borne matter in preparation for the next system start up. The ozone operation will shut down at the end of a preset off time delay.

The ozone recirculation pump 101 draws water from tank 30 and delivers the water to the ozone injection plumbing 102. The ozone generator 103 operates by electricity and requires the input of pure oxygen in order to generate ozone ($O_3$). Oxygen is plumbed from the oxygen generator output 104 into the ozone generator 103. Output from the ozone generator 103 is delivered to an ozone accumulator vessel 105, which is a closed tube container that allows ozone in gaseous form to accumulate in volume. A metering valve 106 is used to control the output, which is delivered to the ozone injector 102. The injector 102 is designed to narrow the water flow from pipe 36, creating a vacuum in the ozone gas line to draw ozone into the water flow. Injector 107 may be opened or closed to vary the volume of ozone injection into the water. Water injected with ozone flows into the bottom of the ozone contact tower 108. The ozone contact tower 108 provides sufficient confinement and height to allow the ozone to saturate the presented waste water. The ozonated water exits at the top of the tower and flows back into the larger internal basin inside waste water tank 30.

The water reclamation, or filtering section is comprised of a high volume water draw pump 40, dual filters 42 and accumulator tank 43, which contain liquid level sensors, return water plumbing 44 that carries water from the micro filters 49 and output water plumbing 45 that carries water to the final filter stages. This system is activated when a low water demand signal is transmitted from the finished water holding tank 90 from sensors in the tank (not shown). When the demand signal activates the system, the input water draw pump 40 operates to draw water from tank 30 and feed into the dual filters 42. In this instance, the dual filters 42 contain 20 micron, serviceable filter membranes at a flow capacity of 150 gallons per minute to insure a positive water flow even when separated residue builds up and clouds the expanded filter membrane outer surfaces. Water pressure gauges 42a are mounted on both filters to indicate water flow pressure within the filters and also to indicate the need to service the filter elements. Shut-off valves, not shown, are located in the plumbing to turn off the water flow during servicing to prevent water influx or back flow.

Filtered water flowing out of dual filters 42 enters an accumulator tank 43 through the plumbing 44 and the entry opening 46a at the tank bottom. In this embodiment tank 43 was an 180 gallon tank. Liquid level sensor probes, not shown, are positioned at points from top to bottom in the tank wall to sense the water level inside the tank, shown in glass 43a, and signal the main controls to respond. Line 46 connects bag filter 48 with tank 43. If when the waste water system turns on and the accumulator tank 43 is half full, the sensor control will be energized at the draw pump 40 to draw water into the accumulator tank 43. A low water sensor probe, not shown, is located near the bottom of the accumulator tank 43 and above a low water safety cut-off sensor probe. In the case of low water, the low water probe will energize circuit power to operate the draw pump 40. Draw pump 40 will remain energized until the rising water in tank 43 comes in contact with a high water probe. The draw pump 40 will be turned off and remain off until the water level drops below the low water probe and the energized control cycle then repeats.

The waste water control system of this invention contains two additional filtration systems, the micro filters 49 and the nano filters 50. The filters 49 filter matter in size greater than 0.1 microns, including matter which may not have been destroyed by ozone contact, such as bacteria and/or giardiancysts. These micro filters 49 are fed by plumbing to draw water from the accumulator tank 43, a high volume centrifugal pump 47 transfers water at proper pressure to the micro filters 49, through a bag type filter 48. The bag filter 48 will filter out particles larger than 25 microns in size. The bag filter membrane in filter 48 will remove clustered water-borne impurities which would tend to clog the membranes in the micro filters 49. A sight gauge 48a provides a visual indication of when the filter bag must be serviced. Filtered water flows from the bag filter 48 to both micro filters 49 plumbed in parallel. This filtration section, including filters 49, operates only when a finished water holding tank 90 demand triggers the system safety into operation and water is present in tank 43. When water level is below low water cut-off in tank 43, pump 47 is inhibited from operating.

The micro filters 49 pass the filtered ozonated water and small particulates of a size less than 0.1 microns through the filter membranes. Not all the water presented to filters 49 will penetrate the filter membranes and this results in a sizable volume of flow-by discharge water. Two flow meters 51 and 52 and two manually adjustable regulator valves, not shown, are plumbed to the discharge water exits of the micro filters 49. The regulator valves may be set to minimize the amount of discharge water that is returned to in-ground tank 20 and to recover a larger amount of that filtered discharge in tank 43 for recycling. By setting the regulator valves to achieve an established pressure inside the micro filters 49, the necessary operating pressure is achieved to force water through the internal membrane pores of the filters 49. The filtered water, which successfully permeates the pores, is delivered to the next filter stage as further purified feed water.

The next filter stage is the carbon filter 61. A carbon filter 61 is utilized to condition the filtered water delivered from the micro filters 49. Carbon filter 61 will remove traces of chlorine that may exist in the filtered water. The explicit sizes of carbon in filters 61 will depend on the chlorine tolerance of the final filtration stage. The carbon filter 61 is constructed so that feed water from the micro filter output enters and permeates up through a bed of gravel and then through a bed of clean activated carbon granules. Filtered water is drawn and fed from the top of the filter 61 by the suction action from the final filter high pressure pump 63. Should the carbon filter vessel 61 encounter a high water condition, overflowing plumbing 64 is supplied to return excess overflowed water to the in-ground tank 20. There are a plurality of probes positioned at points from top to bottom inside the filter 61 to send control signals to turn the proper pumps on and off to sustain water flow control to the final filter stage. A high water probe, a low water probe and a low water safety shut-off probe as described above, will remove power or apply power to pumps as necessary to continue the proper functioning of the system. The final filtration section is comprised in this embodiment of fourteen nano filters 50 fitted into seven pressure containment vessels, a high pressure, high flow centrifugal pump 60, flow meters 66 and 67, permeated water collection manifold and plumbing distribution system 65 connected to the finished water holding tank 90. The nano filters 50 are used to separate and filter out particulates down to 180 molecular weight or larger in size than 0.001 microns. This filtration eliminates molecular particulates that include synthetic dyes, viruses, albumin protein, and endotoxin/pyrogen that the ozone contact may not have destroyed. This stage operates only when a finished water demand from the water holding tank 90 triggers the system into operation and there is sufficient feed water to draw from the carbon filter 61. High pressure water flow is required to force the feed water properly through the filter membranes. In this embodiment, the required working pressure produced in the high pressure centrifugal pump is above 275 psig. Discharge water is excess feed water, which did not penetrate the membranes to become permeate or pure water, and which now passes through a pressure regulator flow meter 66 into the discharge plumbing 24 that drains into tank 20.

The micro filter 49 and nano filter membranes of filters 50 require periodic chemical cleaning to remove matter that has become embedded over time in membrane surface pores or that has accumulated as surface scale. In this embodiment, cleaning can be accomplished without removing the filter membranes from the system. The system must be turned off during cleaning. A special back-wash cleaning unit 70 is plumbed into the micro filters 49 and nano filters 50 using manual shut-off valves or electric drive valves to divert water flow to and from the membrane feed water plumbing in accordance with the cleaning need. A low pressure centrifugal pump 71 is used only in the back-wash cleaning unit function. The proper shut-off controls and check valves prevent the cleaning chemical from back flow into the main water system during back wash. The shut-off and control valves are closed or opened to confine cleaning either to the micro filters 49 or to the nano filters 50, but never to both filters at the same time.

The entire system operates together, and yet some parts may appear independent, so a brief description or a flow description for the operation of the system as provided now for the apparatus described above. Waste water drains into the in-ground tank 10. Internal baffles in the in-ground tanks 10, 20 and 30 cause lint and heavy dirt to separate and settle to the tank bottom. These tanks may be periodically pumped or vacuumed to remove the sediment which has settled to the tank bottom. Accumulated waste water in tank 30 is drawn by the pump 101 to feed an ozone infusion process apparatus 100. In this apparatus, pure oxygen is generated to feed ozone generator 103 and create an atmosphere for pure ozone generation. The ozone generator output of ozone ($O_3$) in gaseous form accumulates in a tank 105 for injection or infusion into the waste water flow. A venturi 102 pulls the ozone gas into and mixes it into the water flow. Bypass flow and adjusting valves produce the highest ozone infusion.

The ozone infused water is delivered to and works in layers from bottom to top surface in ozone tower 108, allowing total ozone infusion and saturation of the water. The ozone saturated water returns to the last in-ground tank 30 to destroy suspended organic or inorganic particulates and thereby purify the water. There is an output holding tank 90 where low water signal demand starts the filter system.

On demand, ozonated waste water is pumped from in-ground tank 30 through filters 42 and enters accumulator tank 43, which has level limit controls to start and stop the input of the water flow. When the accumulator tank 43 signals that there is a usable water volume, a transfer pump 47 starts and water flows to micro filters 49. Water flows from the transfer pump 47 through bag filter 48 and flows with pressure into and through the micro filters 49. On demand from the control system, adjusted high volume water flow is filtered in the micro filters 49 and the output filtered water flows into the carbon filter 61. The control system has adjustable controls and flow meters to ration the filtered discharged water from the micro filters 49, returning larger amounts of the discharge water to tank 43 and a smaller amount of the discharge water returning or flowing back to the in-ground tank 20.

On demand from the control system, water flows through the carbon filter 61 to remove traces of chlorine and the high pressure pump 60 draws the filtered water from the carbon filter 61 and forces it through the membranes of the nano filters or the ultra filters 50. The output of ultra filters 50 is ready to reuse and flows directly to the output water holding tank 90.

The system thus can maintain a desired amount of pure filtered water in the holding tank 90 and permitting the output therefrom to be used for any purpose, including utilization in the laundry or other operation which created the original gray water.

Having described the preferred embodiment, other features of the present invention will undoubtedly occur to those versed in the art, as will numerous modifications and alterations in the embodiments of the invention illustrated, all of which may be achieved without departing from the spirit and scope of the invention as defined in the appended claims.

What is claimed is:

1. A multi-phase process for removal of solid chemical and bacterial waste from contaminated aqueous fluid comprising the steps of:
   a) removing sediment and solid matters from said waste water in a plurality of settling tanks;
   b) transferring waste water from one of said settling tanks to ozonation apparatus;
   c) ozonating said waste water;
   d) transferring ozonated water to a first holding tank through a first filtration system to partially filter the water;
   e) accumulating ozonated and partially filtered water in said first holding tank;
   f) transferring said partially filtered ozonated water through a second filtration system;
   g) transferring the filtered water from said second filtration system through a third filtration system to produce a purified water;
   h) and accumulating the purified water from said third filtration system in a second holding tank;
   i) transferring unfiltered water from said second and said third filtration systems to the first holding tank and to a second one of said settling tank; and
   j) transferring purified water from said third filtration system to a second holding tank for reuse.

2. The invention in accordance with claim 1, wherein said first, second and third filtration systems remove successively smaller particles of a waste matter.

3. The invention in accordance with claim 1, wherein said second filtration system includes filtration for removal of undesirable chemicals.

* * * * *